F. MOENCH.
PROCESS OF RESTORING RUBBER.
APPLICATION FILED JUNE 16, 1915.
1,172,158.
Patented Feb. 15, 1916.
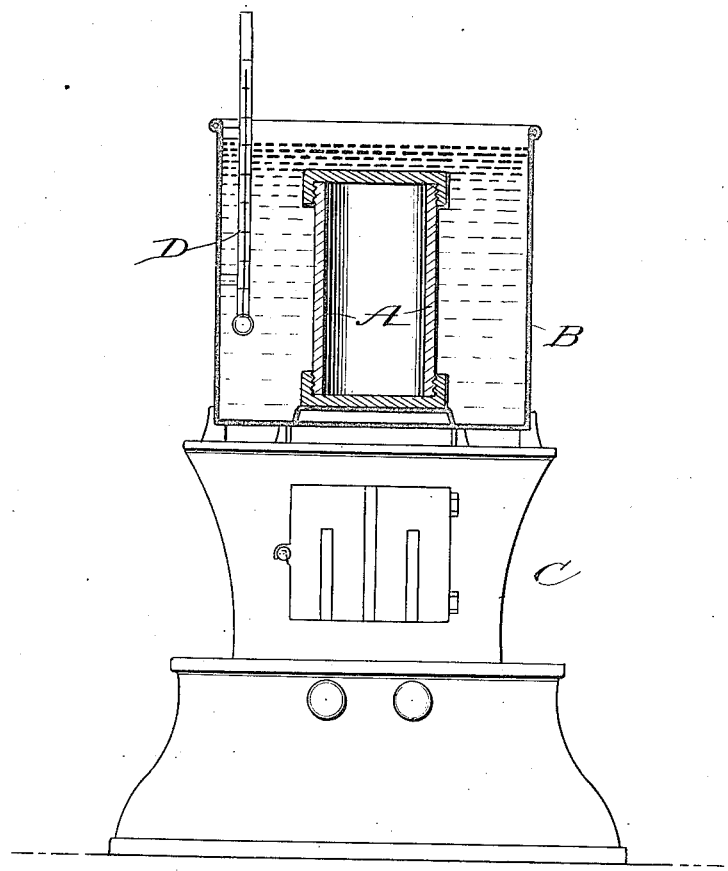
WITNESSES:
INVENTOR
Frederick Moench
BY Munn & Co.
ATTORNEYS

UNITED STATES PATENT OFFICE.

FREDERICK MOENCH, OF RUSHVILLE, ILLINOIS.

PROCESS OF RESTORING RUBBER.

1,172,158.

Specification of Letters Patent.

Patented Feb. 15, 1916.

Application filed June 16, 1915. Serial No. 34,387.

*To all whom it may concern:*

Be it known that I, FREDERICK MOENCH, a citizen of the United States, and a resident of Rushville, in the county of Schuyler and State of Illinois, have invented a new and useful Improved Process of Restoring Rubber, of which the following is a specification.

My present invention relates generally to processes for restoring old rubber, my object being to provide a simple and inexpensive process by means of which new life may be imparted to rubber which has deteriorated from various causes.

Generally speaking, my process, which will be presently described in detail, proposes the addition of a mixture of oil and turpentine to old rubber, and the subsequent heating thereof to a considerable heat and for a considerable time out of the influence of air.

In carrying out my process, for which purpose an apparatus, such as shown in the accompanying drawing, wherein the figure is a view partly in elevation and partly in section, may be utilized, the old or deteriorated rubber is first preferably washed by immersing the same in a cleansing solution, such as gasolene, scrubbing the rubber while immersed, if necessary, and in then thoroughly drying before proceeding with the further steps.

After washing and drying, the rubber is either dipped within, or painted over with, a solution of equal parts of linseed oil (boiled) and turpentine, and a mixture of boiled linseed oil and turpentine with either fire clay, plaster of Paris, or common cement or white clay, forming a plastic composition of the consistency of soft butter, is spread entirely over the rubber to a thickness of from one-thirty-second to one-sixteenth of an inch. The rubber so enveloped is laid upon waxed paper or other suitable material to prevent sticking, and if several layers of the rubber are to be treated at the same time, waxed paper or other material for the same purpose is placed between the layers. The treated rubber is then wrapped in waxed paper and placed within a suitable retort of such a nature as to withstand heavy pressure and permit of its being closed in air-tight relation substantially as shown at A in the drawing. This retort is preferably placed in a vessel substantially as shown at B containing melted paraffin, and is therein subjected to a heat of from 300° to 325° Fahrenheit, for a period of from 45 minutes to one hour by placing the vessel upon a heater C, a thermometer D being utilized to maintain the desired heat.

The rubber may, after cooling, be removed and permitted to season, the seasoning thereof requiring various lengths of time from three to thirty six hours according to the amount of the solution of linseed oil and turpentine used therewith.

The rubber may, if so desired, be chopped into small particles about the size of beet seeds, and soaked in a mixture of linseed oil and turpentine, and thereafter placed within the retort along with an excess of the oil solution of one-half to one part of solution to one part of chopped rubber, the heating being carried out in substantially the same manner as heretofore described.

It has been found that the heat may be applied either slowly or rapidly, and the rubber afterward allowed to cool either slowly or rapidly, without material difference in the results.

It has also been found that the amount of solution applied or added to the rubber should vary with the condition of the rubber and depend upon the extent of its deterioration.

The process is therefore subject to considerable variation as to the amount of solution, the manner in which the solution is added to the rubber, the temperature and time of application of the heat, and the time allowed for seasoning, all as above outlined, but when carried out substantially as I have described, the process will be found to develop new life to the old and deteriorated rubber, restoring the same to a considerable extent and is in addition to this cheap and simple.

I claim:

1. The process of restoring rubber which consists in enveloping old rubber with a plastic mixture containing linseed oil, turpentine, and an earthy material, and subjecting the rubber so enveloped to a continuous heat out of the influence of air.

2. The process of restoring rubber which consists in applying thereto a covering layer formed of a plastic mixture of linseed oil, turpentine, and a clayey material, and subjecting the same to continuous heat out of the influence of air by placing the covered rubber within a closed retort.

FREDERICK MOENCH.

Witnesses:
H. H. SPEED,
BESSE A. JONES.